Sept. 18, 1934. J. M. EDWARDS 1,974,019
BATCH ROASTER
Filed March 10, 1932 8 Sheets-Sheet 1

Fig. 1.

Inventor
J. M. Edwards.
By Mason Fenwick & Lawrence
Attys.

Sept. 18, 1934. J. M. EDWARDS 1,974,019
BATCH ROASTER
Filed March 10, 1932 8 Sheets-Sheet 2

Sept. 18, 1934.    J. M. EDWARDS    1,974,019
BATCH ROASTER
Filed March 10, 1932    8 Sheets-Sheet 3

Sept. 18, 1934.   J. M. EDWARDS   1,974,019
BATCH ROASTER
Filed March 10, 1932   8 Sheets-Sheet 4

Fig. 4.

Inventor:
J. M. Edwards
By Mason Fenwick & Lawrence
Attys.

Sept. 18, 1934. J. M. EDWARDS 1,974,019
BATCH ROASTER
Filed March 10, 1932 8 Sheets-Sheet 5

Sept. 18, 1934. J. M. EDWARDS 1,974,019
BATCH ROASTER
Filed March 10, 1932 8 Sheets-Sheet 6

Sept. 18, 1934.   J. M. EDWARDS   1,974,019
BATCH ROASTER
Filed March 10, 1932   8 Sheets-Sheet 7

Inventor
J. M. Edwards
By Mason Fenwick & Lawrence
Attys.

Sept. 18, 1934.   J. M. EDWARDS   1,974,019
BATCH ROASTER
Filed March 10, 1932    8 Sheets-Sheet 8

Fig. 12.

Patented Sept. 18, 1934

1,974,019

UNITED STATES PATENT OFFICE 1,974,019

BATCH ROASTER

James M. Edwards, Chicago, Ill., assignor to Biedermann Bros. Inc., Chicago, Ill.

Application March 10, 1932, Serial No. 598,023

2 Claims. (Cl. 34—5)

This invention relates to roasters, and more particularly to manually controlled electrically driven batch roasters.

The object of the invention is primarily to provide an improved roaster in which one batch of coffee, peanuts, or the like is roasted at one time; and in which the material to be roasted is preheated before passing into a roasting cylinder subjected to the action of an indirect roasting heat.

Another object of the invention is to provide apparatus of this character with a receptacle adapted to receive a batch of material to be roasted, and to serve as a preheating chamber for one batch while another is being roasted. This object is effected by movably mounting the receiving receptacle on the roasting apparatus, so that in one position it is located to contact with the outside of the roasting chamber to be heated thereby; and, in another position it will be located to discharge the preheated contents into the roasting chamber.

A further object of the invention resides in the provision of a two throw valve for controlling the discharge of material from the roaster in different directions.

Another object of the invention is to provide a novel arrangement for automatically opening and closing pivoted discharge doors located on diametrically opposite sides of a roasting cylinder forming part of this invention.

Still another object of the invention is to provide an improved drive means for rotating the roasting cylinder and for actuating the pivoted discharge doors located in said cylinder, and also the suction fan forming part of the apparatus.

Another object of the invention is to provide novel means for independently regulating the temperature in the several chambers of the apparatus.

A further object of the invention is to provide means to transmit the heat uniformly from a heating chamber to the roasting chamber.

Another object of the invention is to provide a novel arrangement for distributing the heat uniformly through the roasting cylinder, by means of an aperture located directly below the roasting chamber which leads to a branch pipe connected to the suction pipe leading to the casing of the motor operated suction fan; a manually operated valve being located in the said aperture for controlling the suction.

With the above and other objects in view the invention consists in certain novel combinations and arrangements of parts to be hereinafter described.

Referring to the drawings in detail in which like reference characters designate the corresponding parts throughout the several views, 1 designates in general a rectangular shaped housing bolted to a rectangular frame 2, enclosing and supporting the operating and roasting mechanism. This housing comprises the side walls 3 and 4, a front wall 5 and the rear wall 6, said walls terminating at their upper ends in laterally extending horizontal flanges, in line with the axis of a roasting drum to be described later.

A removable semi-circular closure 7, provided with laterally extending flanges on its lower end, is bolted to the horizontal flanges of the said housing 1.

Pivotally secured to the side wall 3 of the housing 1, is a preheating and delivery chamber 8, of semi-conical formation, to receive and preheat green coffee or other material. The side 3 of the roaster has a pivot pin 81 suitably secured thereto. A collar 82 fixed to the pin 81 supports the lower arm 83 of a U-shaped bracket 84. The upper arm 85 of the bracket 84, as well as the arm 83, are suitably bored to fit rotatably on pin 81; and a nut 86 on the upper end of pin 81 secures the bracket 84 rotatably on the pin 81.

A leaf spring 87 has its lower end suitably clamped to the pin 81. The upper end of this spring is shaped to contact with lower arm 83 of the bracket 84, in order to hold the bracket 84 yieldingly in any position of angular adjustment on the pivot pin 81.

Figure 1:
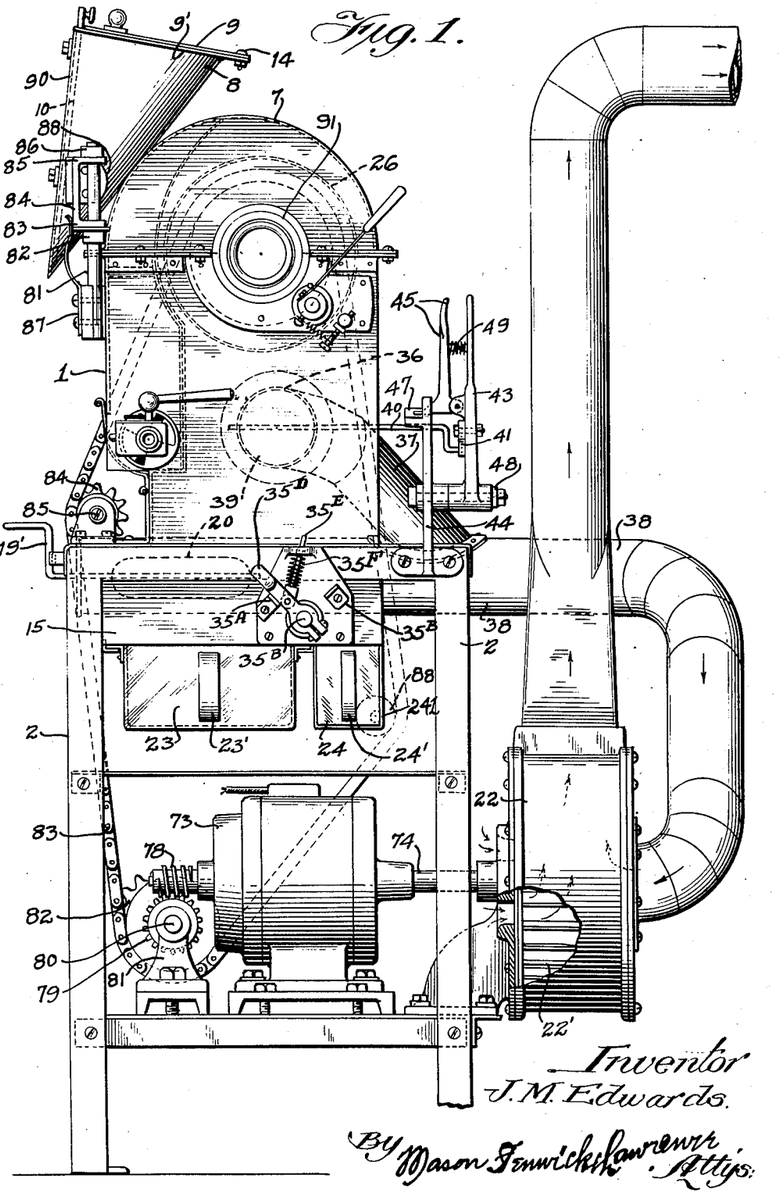
Figure 1 is a front elevation of the roasting machine constructed in accordance with the invention.

A bracket 88 fixed to the curved face of the conical receptacle 8 has a flange 89 welded, or otherwise secured, to the bracket 84 to permit the receptacle to move from the preheating and receiving position shown in Figure 1, through angle of ninety degrees to a position (shown in full lines in Figure 12) in which the flat face 90 of the receptacle contacts with the circular rim of a valve controlled aperture 91 in the roasting chamber.

The receptacle 8 is provided with closure plate 9 pivoted to a flange 9' extending laterally from the upper circular edge of the receptacle 8. A valve 10 (see Figure 2) is slidably mounted on the flat face of receptacle 8 to control a delivery opening 11 formed in the lower end of said face. This valve 10 can be manually opened by gripping the knob 10' secured to the upper end of the valve 10. The plate 9 is provided with a slot 12 (see Figure 12) at its pivoted end and with a notch 13 at its opposite end. The slot 12 permits the plate 9 to be swung open after the said plate 9 has been moved horizontally on its pivot 14 to the end of the slot 12, when green coffee or similar material is being deposited in the receptacle 8.

Figure 2:
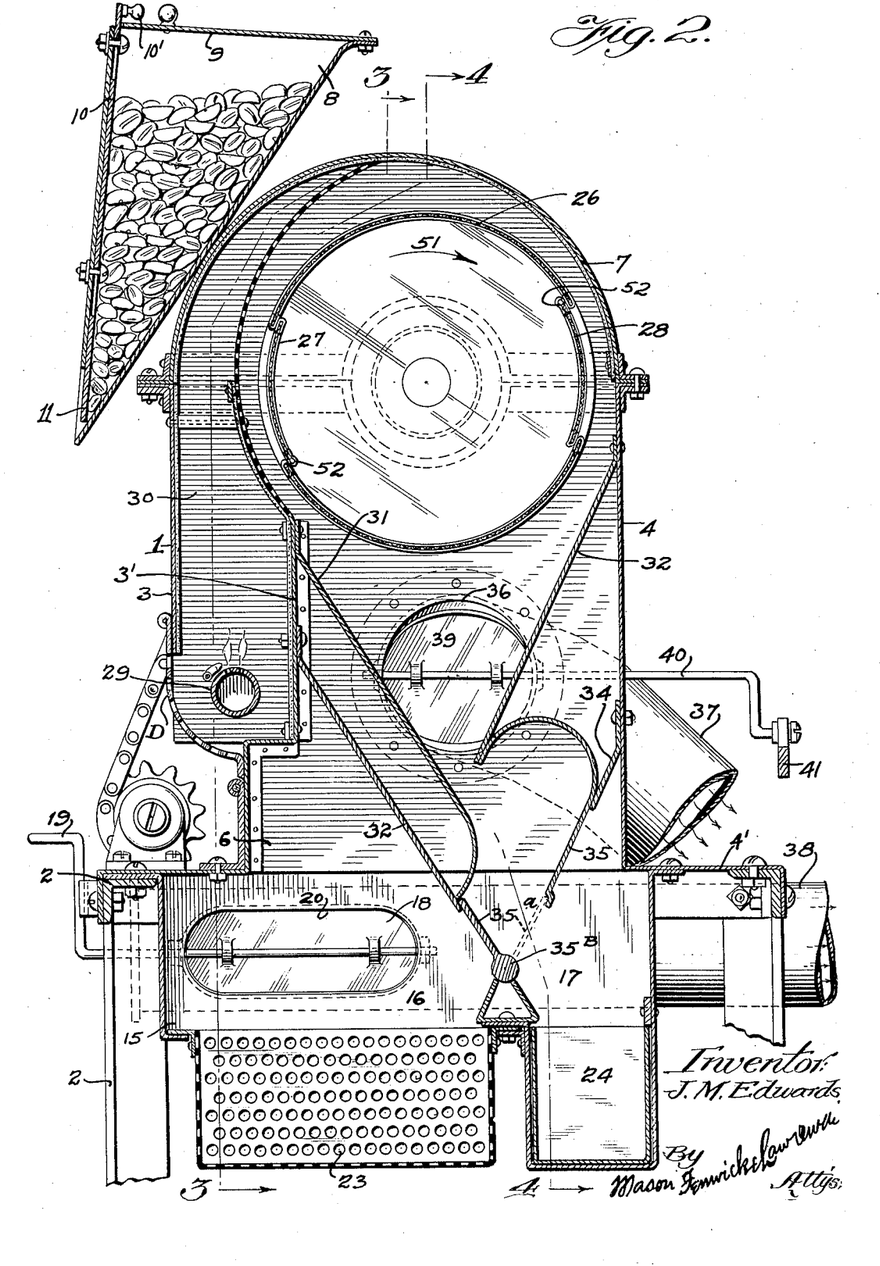
Figure 2 is a vertical section of the coffee roaster taken on line 2—2 of Figure 3.

As clearly illustrated in Figure 2, a casing 15 is bolted at one side to a lateral extension 4' of the side wall 4; and, on the other side is bolted directly to the supporting frame 2. The left hand side 16 of chamber 15 acts as a cooling chamber for coffee received from the roaster, and the right side 17 acts as a chaff receiving chamber. A valve 18 fixedly secured to a crank shaft 19 journaled in a wall of casing 15, controls an aperture 20 in said casing leading to a pipe 38 connected to the casing 22 of the suction fan 22'.

Slidably secured to the bottom of casing 15 is a perforated coffee receptacle or drawer 23, provided with a handle 23' for removing the same. A chaff receiving drawer 24 is also slidably secured within the lower extension 241 of the casing 15 and also provided with a handle 24' for removing same.

A gas burner 29 centrally located near the lower end of the heating chamber 30 is provided with the usual gas mixer 29A, forming a part of the valve casing 29B, and with a handle 29C forming a part of the valve for controlling the gas supply. The heating chamber 30 is formed by the side wall 3, and an inner vertical wall 3', the upper end of which is curved and rests against inner lined wall of the removable cover to provide space between the side wall 3' and the roasting cylinder. The curved section of the wall 3' is perforated to permit the hot air to pass through the perforations directly above the horizontal plane of the axis of the roasting cylinder. The perforations through this curved section are provided for the purpose of uniformly distributing the hot air passing from the heating chamber to the roasting chamber.

The inside of wall 3 and cover 7 and the lower part of wall 3' are lined with asbestos to retain the heat in roasting chamber, the lining on wall 3' terminating in the horizontal plane of the axis of the roasting drum.

A chute for directing the roasted coffee and the chaff delivered from the roasting cylinder to their respective receptacles is preferably composed of two inclined plates 31 and 32; an inclined plate 33 being preferably arranged parallel with the plate 31 for the purpose of supporting and strengthening the plate 31. The said plates 31 and 32 are both fixedly secured to the vertical wall 3' by means of rivets or in any other manner. The inclined plate 32 is also supported and strengthened by a partly inclined plate 34 riveted or otherwise affixed to the wall 4, and by the plate 35, the lower end of which is inclined and rests against the plate 34 and the upper end of which is curved so as to come in contact and support the plate 32, the upper end of the said plate 32 being riveted or otherwise secured to the wall 4.

Figure 3:
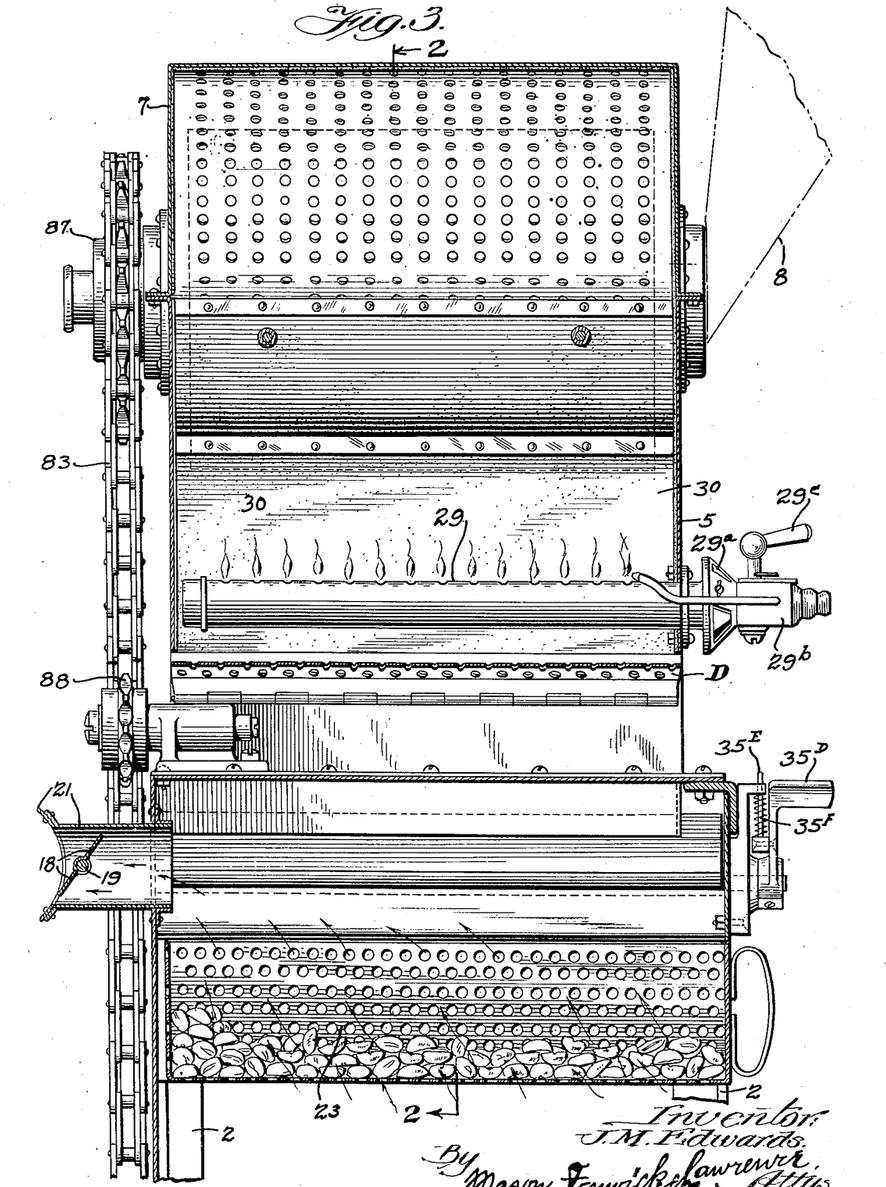
Figure 3 is a vertical section taken on line 3—3 of Figure 2.
Figure 4:
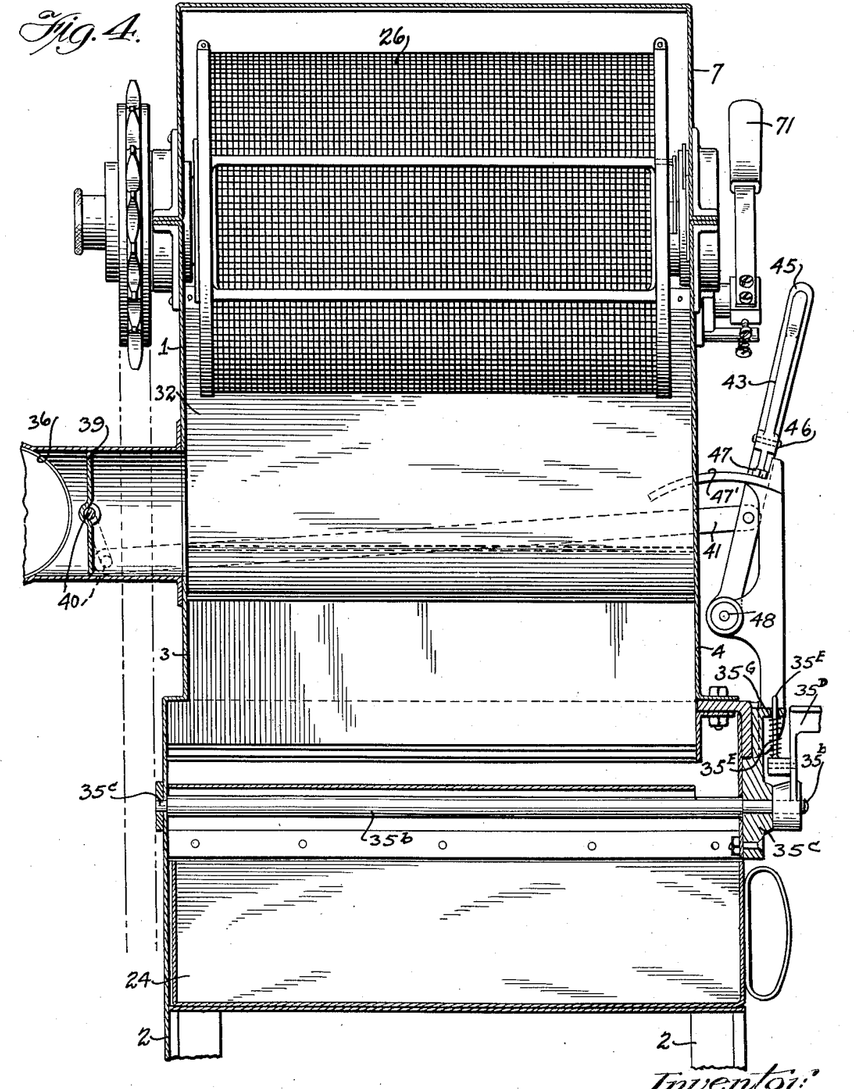
Figure 4 is a vertical section taken on line 4—4 of Figure 2.
Figure 5:
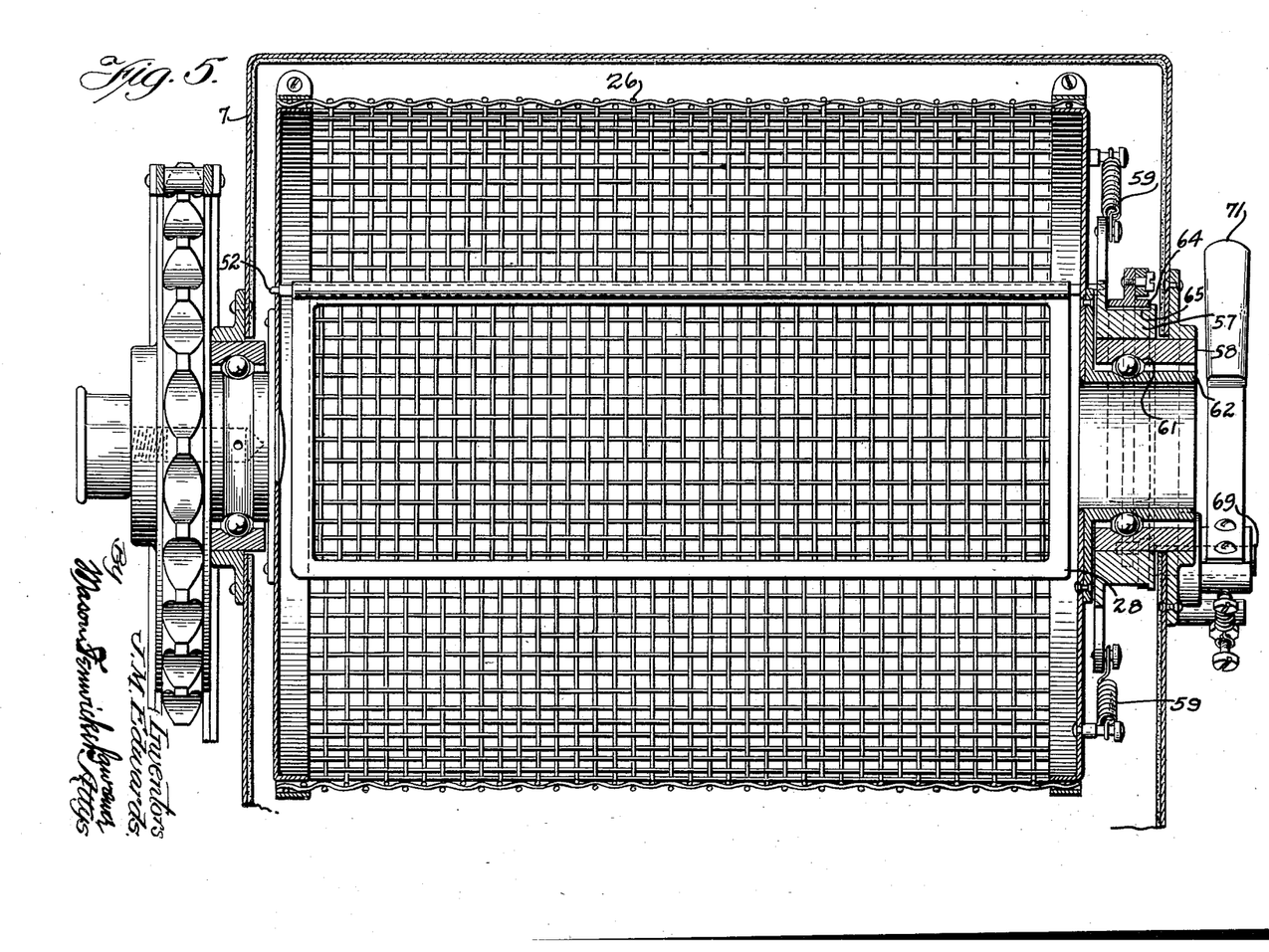
Figure 5 is a vertical section taken on line 5—5 of Figure 6.

As shown in Figures 2 and 3, a valve 35A (located centrally between the cooling chamber and the chaff chamber) is formed integral with an oscillating or swinging shaft 35B which is mounted in bearings 35C and controlled by a swinging lever 35D. Said valve 35A is held either against the plate 35 for directing the roasted coffee through the cooling chamber to the coffee receptacle 23 or, against the plate 33 for directing the chaff and other foreign matter to the chaff receptacle 24. A pin 35E carrying a compression spring 35F is pivotally fixed to the lever 35D midway between the shaft 35B and the end of the said lever 35D. The pin 35E is also movably guided in an aperture in the lug 35G formed on the vertical extension of the bearing 35C. It will be readily seen from Figure 1 and Figure 3, that the pin 35E and spring 35F will hold the lever 35D against either of the abutments 35H when the lever 35D is swung either to the right or to the left of the machine for controlling the feed of the coffee and the chaff to their respective receptacles.

Figure 12:
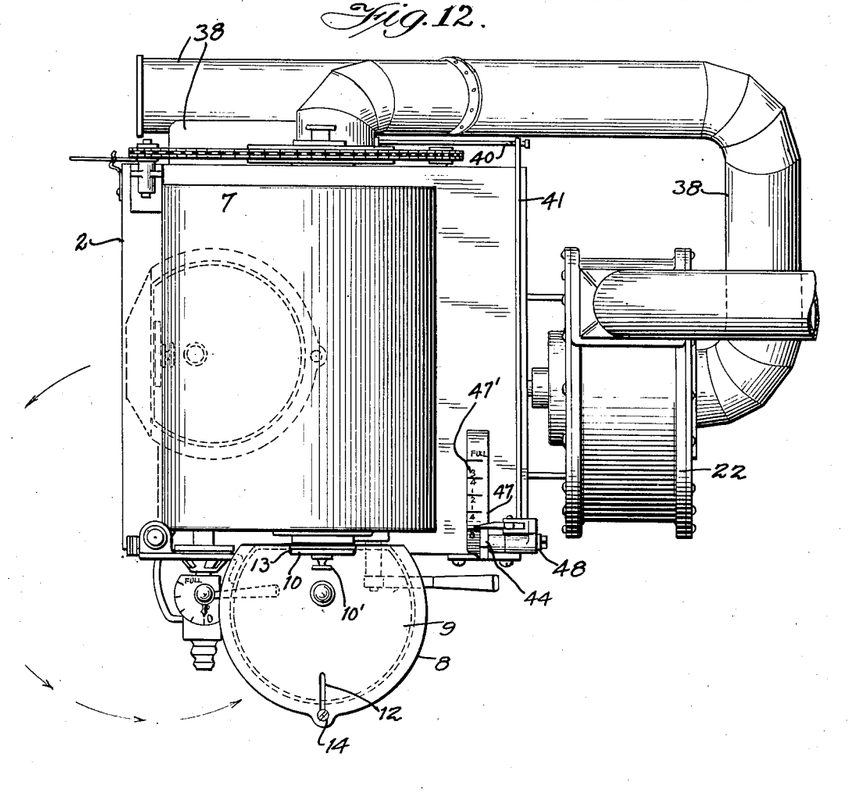
Figure 12 is a top plan view of the coffee roaster.

As shown in Figures 1, 2 and 12, directly below the roasting cylinder is an aperture 36 leading to a branch pipe 37 connected to the suction pipe 38 leading directly to one side of the casing 22 of the suction fan 22'. A valve 39 fixedly secured to one end of a crank shaft 40 pivotally mounted in bearings within the aperture 36; a link 41 being pivotally secured at one end to the crank shaft 40 and at its opposite end to the swinging lever 43. The lower end of the lever 43 is pivotally fixed to a supporting frame 44, the upper end of said frame being provided with graduations as at 47' (shown in Figure 12) to guide the operator in rotating valve 39 to regulate the suction in the roasting chamber, and draw hot air at any desired speed uniformly through the coffee within the roasting cylinder and ensure uniform roasting thereof. A supplemental lever 45 is pivotally secured to the lever 43 by pivot 46. The lower extremity of the lever 45 opposite its pivot 46 rests on the surface 47 formed on the upper end of the supporting frame 44. It will be readily seen that in order to operate and swing the lever 45 on its pivot 46 the operator must grip the upper ends of levers 43 and 45 and draw the same together against the pressure of the spring 49 interposed between said levers.

The construction of the roasting cylinder (which is preferably made of foraminous material) and the brake mechanism and the associated parts in detail, all of which are more clearly illustrated in Figures 5 to 11 inclusive will now be described.

Figure 6:
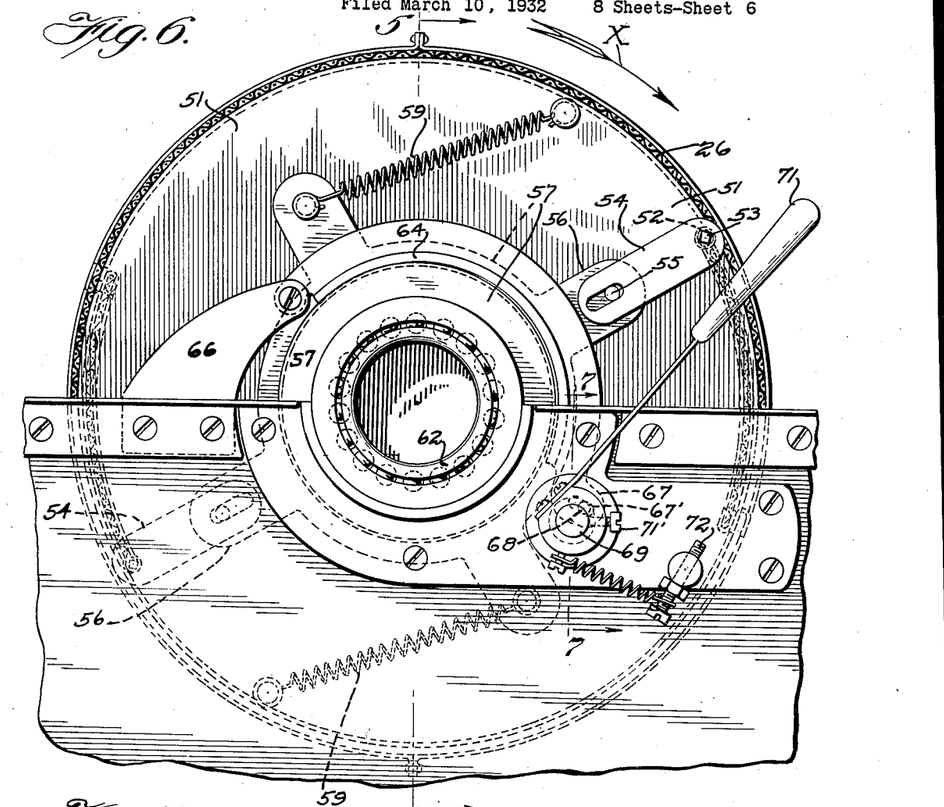
Figure 6 is a fragmentary front elevation of the roaster showing the semi-circular upper portion of the housing removed to expose the upper half of the roasting cylinder, pivoted discharge doors in the roasting cylinder being shown in closed position.
Figure 7:
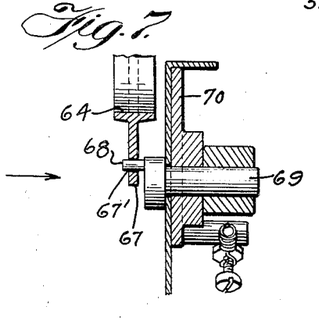
Figure 7 is a fragmentary vertical section taken on line 7—7 of Figure 6.
Figure 8:
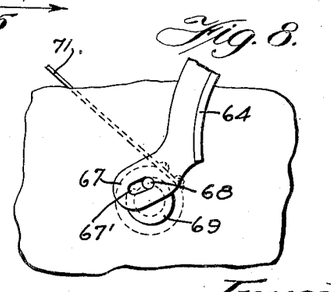
Figure 8 is a fragmentary front elevation of the parts shown in Figure 7, as indicated by the arrow.

In Figures 6 to 8 inclusive, the various elements of the machine are shown in normal operative position; that is, during a roasting operation, with the parts rotating in the direction indicated by the arrow X. The roasting cylinder 26 is provided with two diametrically located discharge doors 27—28 hingedly supported by the disk-like end walls 51 of the roasting cylinder 26, the hinge-pintles 52 terminating in square shouldered shanks 53 to each of which is fastened a slotted link 54 which in turn, is pivotally and slidably connected to the pin 55 projecting laterally from the lug 56 of the ring member 57. This ring member 57 is centrally apertured and rotates freely about the stationary bearing member 58. It will be understood that the aforesaid members 26, 27, 28, 52, 54 and 57 travel with the roasting cylinder 26; the springs 59 having tension in the direction of rotation of the roasting cylinder 26, thereby keeping the pivoted discharge doors 27 and 28 closed during the roasting process.

The bearing member 58 includes a hollow ball bearing race 61 (see Figure 5) fixed rigidly to the casing of the roaster. Within said bearing member 58 is mounted the apertured trunnion bearing 62 secured to the central portion of the roasting cylinder 26 shown more clearly in Figure 5. It is through this apertured trunnion bearing 62 that the coffee beans are fed into the roasting cylinder 26 from the hinged or pivoted preheating and receiving chamber 8, shown in Figures 1, 2 and 12.

Figure 9:
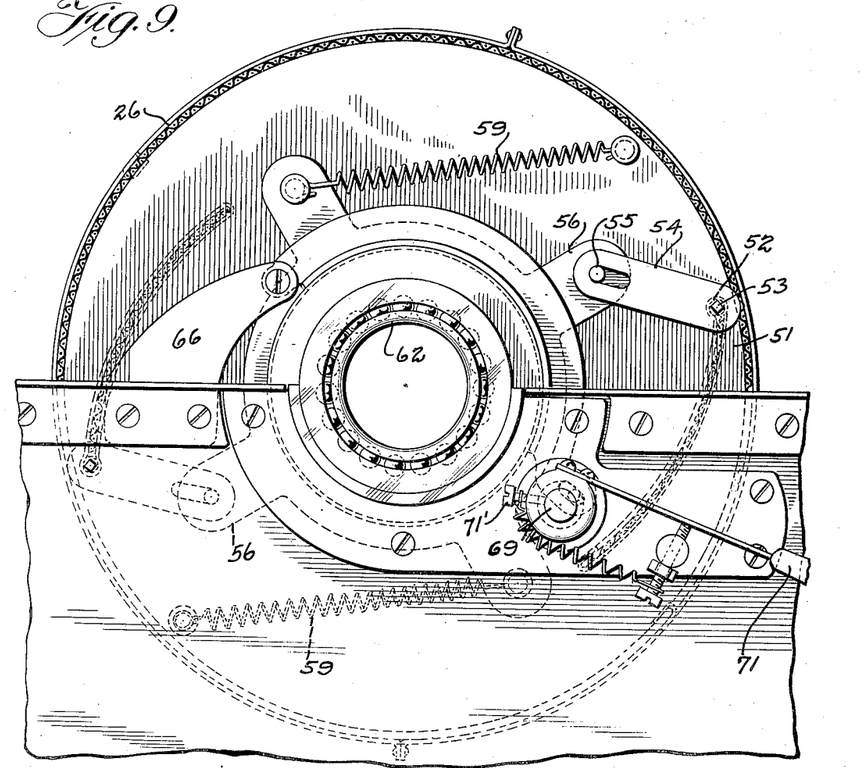
Figure 9 is a view similar to Figure 6 with parts shown in different positions.
Figure 10:
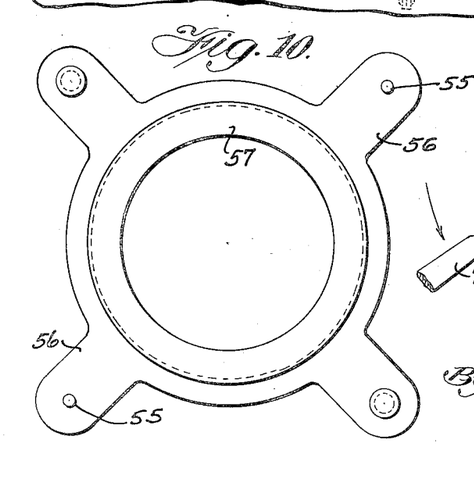
Figure 10 is a front elevation of one of the elements of the invention.
Figure 11:
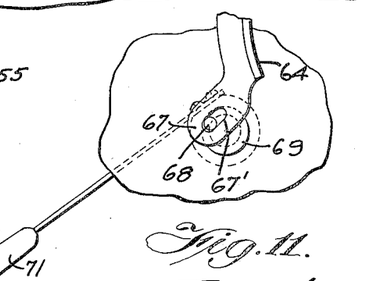
Figure 11 is a fragmentary detail in front elevation of several parts shown in Figure 9.

Resuming the description of the braking mechanism, the brake shoe 64 which, is T-shaped in cross section, rides in an annular groove 65 of the ring member 57; and, as shown in Figure 6, is in a retracted position from pressure contact with the ring member 57. The brake shoe 64 is pivotally mounted on a bracket 66, supported by the casing of the roaster, as shown in Figure 6 and Figure 9; and said brake shoe 64 has at its opposite end a projecting lug 67 provided with a slot 67'. Into this slot 67' projects an eccentric pin 68. This eccentric pin 68 is part of a short rocker shaft 69 projecting through a bearing plate 70 from the outside, and there is mounted a spring held handle 71 fastened to the short rocker shaft 69 by a set screw 71' of the handle hub.

An adjustable stop 72 is provided for the proper tensional swing throw of the handle 71 and the eccentric pin 68 for the purpose of bringing the proper frictional engagement of the arcuate brake shoe 64 with the ring member 57. Therefore, when this is evident the various elements move to the respective positions illustrated in Figure 9 of the drawings; that is, the eccentricity of the pin 68 in the slot 67' of the arcuate brake shoe 64 retards the rotation of the ring member 57, thereby opening the pivoted discharge doors 27 and 28, as shown in dotted lines in Figure 9, against the tension of springs 59. When the handle 71 is released to position, shown in Figure 6, the brake shoe 64 retracts and the pivoted discharge doors 27 and 28 are closed again by the action of the springs 59. While this has been accomplished, the roasted coffee beans have been emptied into the cooling receptacle 23.

The machine is driven by an electric motor 73 provided with the usual armature shaft 74 to one end of which a suction fan 22' is fixedly secured to rotate within the casing 22 provided with the exhaust pipe 77. The other end of the armature shaft 74 is provided with a worm 78 engaging a worm wheel 79 rigidly affixed to a shaft 80, said shaft 80 being supported in a bearing 81. A sprocket 82 is also fixedly secured to the shaft 80 and is provided with a chain 83 which passes over an idler sprocket 84 revolvably mounted in a bearing 85, hence over a sprocket 86 (see Figure 3) secured to the outer ball race 87 on which the roasting cylinder is fixedly mounted and then over an idler 88 to the said sprocket 82.

In the operation of the apparatus disclosed herein it is intended that the valve 35 shall be moved to the position shown in Figure 2 of the drawings to direct material from the drum 26 to the chaff receiving drawer 24. During the roasting of the coffee beans in the drum 26, the chaff and lighter débris will become separated from the coffee beans and passes through the apertures in the foraminous drum 26. The suction, controlled by the valve 36, will drawn most of the chaff and debris into the chaff receptacle 24.

At the completion of a roasting operation, the valve 35a must be moved from the position shown in Figure 2 to the dotted line position illustrated therein, in order to direct the roasted batch into the foraminous cooling receptacle 23. To effect the discharge of material from the drum 26, it will be necessary for the operator to pull down the handle 71 from the position shown in Figure 6 to the position shown in Figure 9, against the adjustable contact 72. When this is done, the projecting lugs 56 on the ring 57 rotate the links 54 against the tension of springs 59 to swing the doors 27 and 28 to the open position illustrated in Figure 9, and thereby discharge the roasted batch during the rotation of the drum. As soon as the drum is empty the operator releases the handle 71 and the tension of the lower spring on the setscrew 71', as well as the tension of the springs 59 on the lugs 56, restores the links 54 and the doors 27 and 28 to the door closing position illustrated in Figure 6.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. In a coffee roaster a casing having a foraminous cylinder journaled therein, means for indirectly applying a roasting heat to said cylinder, and a valved delivery receptacle pivoted about a substantially vertical axis relative to said casing to be moved bodily toward and from said casing for feeding material into said cylinder.

2. A batch roaster comprising a casing, a foraminous cylinder rotatable about a substantially horizontal axis therein, means for indirectly applying a roasting heat to said casing, and a receptacle pivoted to said casing to contact therewith in one position for preheating material deposited therein and to be moved from said preheating position to contact with one end of said cylinder for transferring preheated material into said cylinder.

JAMES M. EDWARDS.